(12) United States Patent
Boesch

(10) Patent No.: US 7,917,600 B2
(45) Date of Patent: Mar. 29, 2011

(54) METHOD, COMPUTER PROGRAM PRODUCT, AND SYSTEM FOR SELECTING AND MIGRATING INFORMATION AND DEVICE DRIVERS TO A COMPUTER SYSTEM

(75) Inventor: S. Christopher Boesch, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 74 days.

(21) Appl. No.: 12/053,362

(22) Filed: Mar. 21, 2008

(65) Prior Publication Data

US 2008/0168153 A1 Jul. 10, 2008

Related U.S. Application Data

(62) Division of application No. 09/908,283, filed on Jul. 18, 2001, now abandoned.

(51) Int. Cl.
G60F 15/16 (2006.01)
G06F 15/177 (2006.01)
(52) U.S. Cl. .................... 709/217; 709/220; 709/221
(58) Field of Classification Search .............. 709/202, 709/213, 220–222, 217; 705/1–10
See application file for complete search history.

(56) References Cited

U.S. PATENT DOCUMENTS

| | | | |
|---|---|---|---|
| 4,949,257 A | 8/1990 | Orbach | |
| 5,513,116 A | 4/1996 | Buckley et al. | |
| 5,546,316 A | 8/1996 | Buckley et al. | |
| 5,559,714 A | 9/1996 | Banks et al. | |
| 5,561,604 A | 10/1996 | Buckley et al. | |
| 5,572,572 A | 11/1996 | Kawan et al. | |
| 5,583,763 A | 12/1996 | Atcheson et al. | |
| 5,726,898 A | 3/1998 | Jacobs | |
| 5,768,142 A | 6/1998 | Jacobs | |
| 6,038,399 A * | 3/2000 | Fisher et al. | 713/1 |
| 6,038,597 A | 3/2000 | Van Wyngarden | |
| 6,055,513 A | 4/2000 | Katz et al. | |
| 6,092,189 A * | 7/2000 | Fisher et al. | 713/1 |
| 6,119,099 A | 9/2000 | Walker et al. | |
| 6,167,383 A | 12/2000 | Henson | |
| 6,182,275 B1 * | 1/2001 | Beelitz et al. | 717/175 |
| 6,196,458 B1 | 3/2001 | Walker et al. | |
| 6,247,128 B1 * | 6/2001 | Fisher et al. | 713/100 |
| 6,324,522 B2 * | 11/2001 | Peterson et al. | 705/28 |
| 6,728,877 B2 * | 4/2004 | Mackin et al. | 713/100 |
| 6,775,829 B1 | 8/2004 | Kroening | |
| 6,922,831 B1 * | 7/2005 | Kroening et al. | 717/172 |
| 6,928,644 B1 * | 8/2005 | Kroening et al. | 717/175 |
| 6,963,908 B1 * | 11/2005 | Lynch et al. | 709/220 |

* cited by examiner

*Primary Examiner* — Joon H Hwang
*Assistant Examiner* — Sargon N Nano
(74) *Attorney, Agent, or Firm* — Haynes and Boone, LLP

(57) ABSTRACT

A method performed by a first computer system includes receiving one or more of a plurality of files from a second computer system in response to a selection of the one or more of the plurality of files by a customer of the second computer system and receiving network settings from the second computer system. The method also includes providing a third computer system to the user, providing a medium that includes the network settings to the customer where the medium is configured to provide the network settings to the third computer system, and providing the one or more of the plurality of files to the third computer system in response to a request received from the third computer system.

25 Claims, 7 Drawing Sheets

METHOD, COMPUTER PROGRAM PRODUCT, AND SYSTEM FOR SELECTING AND MIGRATING INFORMATION AND DEVICE DRIVERS TO A COMPUTER SYSTEM

CROSS-REFERENCE TO RELATED APPLICATION

This application claims priority to and is a divisional of co-owned co-pending U.S. patent application Ser. No. 09/908,283, filed Jul. 18, 2001, which is incorporated herein by reference in its entirety.

BACKGROUND

The disclosures herein relate generally to computer systems and more particularly to a method, computer program product, and system for selecting and migrating information and device drivers to a computer system.

Advances in computer hardware or software often provide a customer with incentives to upgrade a computer system. One way a customer can upgrade a computer system is to order a new computer system from a computer manufacturer or computer vendor. The customer may wish to include information from an old computer system onto the new computer system. The information may include files, device drivers, or other information. Although the customer may be able to provide the information to the manufacturer or vendor for installation on the new computer system, the manufacturer or vendor may be reluctant to allocate the additional time to install customer's information.

It would be desirable to provide a customer with the ability to migrate information and device drivers to a new computer system without significantly increasing the amount of time it takes for a computer manufacturer or computer vendor to provide the new computer system to the customer. Accordingly, what is needed is a method, computer program product, and system for selecting and migrating information and device drivers to a computer system.

SUMMARY

One embodiment, accordingly, provides a method performed by a first computer system. The method includes receiving one or more of a plurality of files from a second computer system in response to a selection of the one or more of the plurality of files by a customer of the second computer system and receiving network settings from the second computer system. The method also includes providing a third computer system to the customer, providing a medium that includes the network settings to the customer where the medium is configured to provide the network settings to the third computer system, and providing the one or more of the plurality of files to the third computer system in response to a request received from the third computer system.

A principal advantage of this embodiment is that various shortcomings of previous techniques are overcome. For example, a computer manufacturer may provide customers the ability to migrate information and device drivers to a new computer system without increasing the amount of time needed to manufacture the computer system. In addition, the embodiments may be used by a computer manufacturer or vendor to offer value added services to customers.

DETAILED DESCRIPTION

Figure 1:
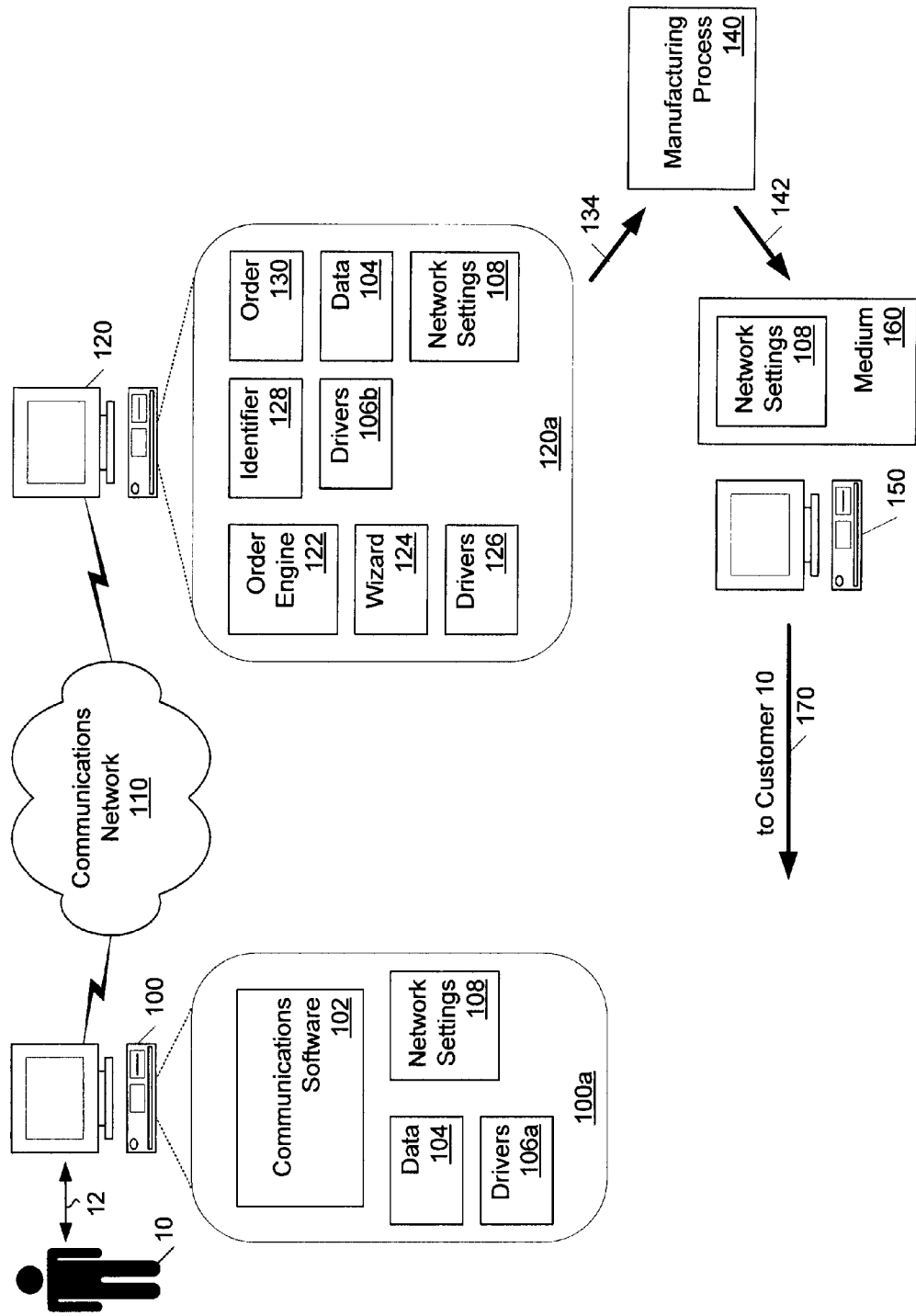
FIG. 1 is a diagram illustrating an embodiment of selected portions of a system for selecting and migrating information and device drivers to a computer system.

FIG. 1 is a diagram illustrating an embodiment of selected portions of a system for selecting and migrating information and device drivers to a computer system 150. In FIG. 1, a customer 10 provides inputs to and receives outputs from a computer system 100 as indicated by an arrow 12. Computer system 100 is configured to communicate with a computer system 120 using a communications network 110. Communications network 110 may be any type of network configured to allow computer system 100 to communicate with computer system 120. For example, communications network 110 may be a global communications network such as the Internet, an intranet, a wireless network, a local area network, a wide area network, or a point-to-point connection. Computer system 100 and computer system 120 may each communicate with communications network 110 using a modem, a network device, or other communications device.

As shown by a box 100a, computer system 100 includes communications software 102, data 104, device drivers 106a, and network settings 108. Communications software 102 may be any software that allows a computer system 100 to communicate using communications network 110. For example, communications software 102 may be a web browser such as Internet Explorer or Netscape Communicator. Data 104 includes a set of files stored on computer system 100. The files in data 104 include files created by customer 10. Device drivers 106a include a set of device drivers configured to cause devices (not shown in FIG. 1) associated with computer system 100 to be operated in conjunction with computer system 100. These devices may be included internally in computer system 100 or may couple externally to computer system 100 using any suitable direct, network, or wireless connection. Examples of such devices include printers, scanners, facsimile machines, copiers, and audio devices. Network settings 108 include settings used by computer system 100 to connect and communicate with communications network 110. For example, these settings may include dial-up numbers, Internet protocol (IP) addresses, and/or proxy settings.

As shown by a box 120a, computer system 120 includes an order engine 122, a wizard 124, and device drivers 126. Order engine 122 is configured to cause an order for a computer system 150 to be received from a customer such as customer 10 using communications network 110. Computer system 150 may be a build-to-order computer system where the customer specifies one or more hardware and/or software components to be installed in computer system 150. In response to receiving such an order from customer 10, order engine 122 causes order information 130 and identifier 128 to be stored onto computer system 120. Order information 130 includes information that identifies a type and/or components of computer system 150 as ordered by customer 10. Identifier 128 includes information that identifies customer 10 as the customer. Identifier 128 may be included in or stored separate from order information 130.

Order engine 122 causes order information 130 and identifier 128 to be provided to a manufacturing process 140 to cause computer system 150 to be manufactured in accordance with order information 130 as indicated by an arrow 134. Manufacturing process 140 generates computer system 150 according to order information 130 as indicated by an arrow 142. Subsequent to being manufactured by manufacturing process 140, computer system 150 is provided to customer 10 as indicated by an arrow 170. Computer system 150 may be provided to customer 10 by being shipped to customer 10, made available for pickup by customer 10, or in any other way. In other embodiments, computer system 150 may be provided to customer 10 from an inventory of computer systems, i.e. computer system 150 may be manufactured prior to being ordered by customer 10.

In other embodiments, orders may be received from customer 10 in other ways including by telephone or in person at a wholesale or retail outlet. In these other embodiments, order information 130 and identifier 128 may or may not be stored on a computer system such as computer system 120.

Customer 10 may wish to include information from computer system 100 onto computer system 150. The information may include files, device drivers, or other information stored on computer system 100. Wizard 124 provides customer 10 with the ability to migrate information and device drivers to computer system 150. The functions of wizard 124 as described below may be included as part of a process of ordering computer system 150 or may be offered to customer 10 separately from an ordering process.

Wizard 124 offers customer 10 with an option to migrate information and/or device drivers from computer system 100 to computer system 150. Wizard 124 is a software program accessible from computer system 120 by customer 10 using communications software 102 and communications network 110. The instructions of wizard 124 may be executed by computer system 120, computer system 100, or on both computer system 120 and computer system 100. Customer 10 accesses wizard 124 by providing an address to communications software 102. The address may be a web address, i.e. URL, or any other suitable address.

In response to being accessed by customer 10, wizard 124 provides customer 10 with an option to migrate information and/or device drivers from computer system 100 to computer system 150. Customer 10 may select this option in any suitable manner such as by clicking on a box or typing in a response. In response to customer 10 selecting the option, wizard 124 guides customer 10 through the process of selecting and migrating the information and/or device drivers to computer system 150. Wizard 124 may include any suitable information to be received from customer 10 such as a login name and password, contact information, or a customer number.

Prior to migrating information or device drivers, wizard 124 guides customer 10 through a process of selecting information and device drivers from computer system 100 to be migrated. Wizard 124 may guide customer 10 through this process in several ways.

First, wizard 124 may provide customer 10 with the ability to select one or more files or directories for migration. As used herein, the term directory also refers to a folder. A directory may include a set of files and/or a set of other directories. This may occur by providing customer 10 with an ability to type in or otherwise indicate specific files or directories that are located on computer system 100 or that are accessible using computer system 100. For example, customer 10 may type in or otherwise indicate a directory "C:\My Files\" and a file "C:\Documents\info.wpd".

Wizard 124 may also cause the information on computer system 100 to be detected in response to file types selected by customer 10. In this way of selecting information for migration, wizard 124 provides customer 10 with an ability to select files associated with a file type. A file is typically created or generated on computer system 100 by customer 10 using an application software program (i.e., an application). Each application stores a file according to a file type. The file type may be specific to a particular application or may be used by multiple applications. File types are often identifiable by an extension attached to the file name. An example of selecting information to migrate using file types is shown in FIG. 2a.

Figure 2A:
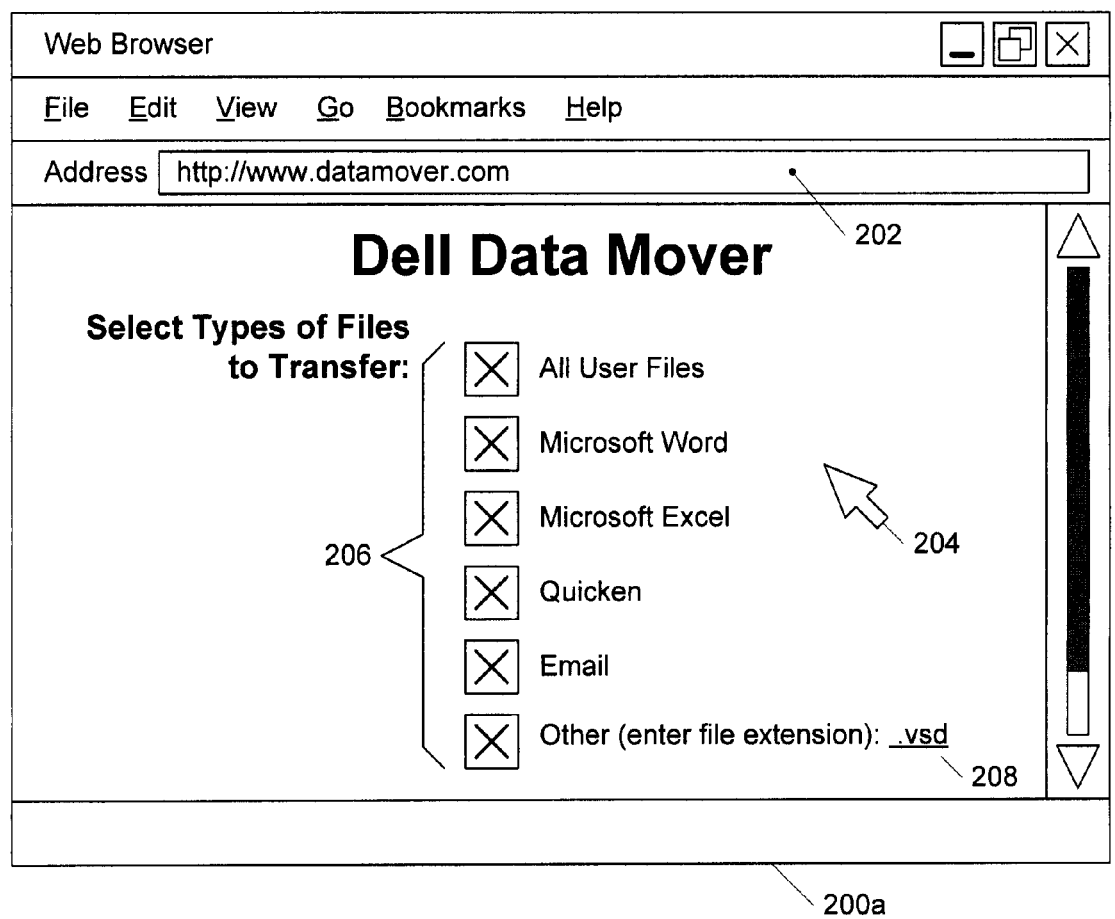
FIG. 2a is a diagram illustrating an embodiment of a first screen shot for selecting and migrating information and device drivers to a computer system.

FIG. 2a is a diagram illustrating an embodiment of a screen shot 200a generated by communications software 102 for selecting and migrating information and device drivers to a computer system. In screen shot 200a, customer 10 has provided an address, to communications software 102 as indicated by the address displayed in an address box 202. In this embodiment, wizard 124 provides customer 10 with an option to select file types using checkboxes 206. Customer 10 may select one or more of checkboxes 206 by controlling pointer 204 in conjunction with an input device. Pointer 204 may be controlled by customer 10 using an input device such as a mouse, a track ball, a touch pad, a keyboard, or other devices configured to allow customer 10 to control pointer 204. Each checkbox 206 is associated with one or more file types that may be selected by customer 10.

As shown in FIG. 2a, customer 10 may select a checkbox associated with "All User Files", "Microsoft Word", "Microsoft Excel", "Quicken", "Email", and/or "Other" file types. The "All User Files" option allows customer 10 to select files on computer system 100 created or generated by customer 10 or another user of computer system 100. The "Microsoft Word", "Microsoft Excel", and "Quicken" options allow customer 10 to select files generated or usable by each of these applications, respectively. The "Email" option allows customer 10 to select files generated or usable by email applications. The "Other" option allows customer 10 to select files that end with a specific file extension by entering the file extension in a location 208. In the example shown in FIG. 2a, customer 10 has entered the file extension ".vsd" which is associated with an application called Visio. Each checkbox 206, accordingly, may be used by customer 10 to select one or more file types to be migrated.

Further, wizard 124 may cause the information on computer system 100 to be detected and may provide customer 10 with an indication of the set of information on computer system 100 that may be selected for migration. The indication may include a set of graphical or textual elements associated with files and directories that are located on computer system 100 or that are accessible by computer system 100. Wizard 124 may provide customer 10 with an ability to select individual files or set of files using a directory. An example of this possibility is shown in FIG. 2b.

Figure 2B:
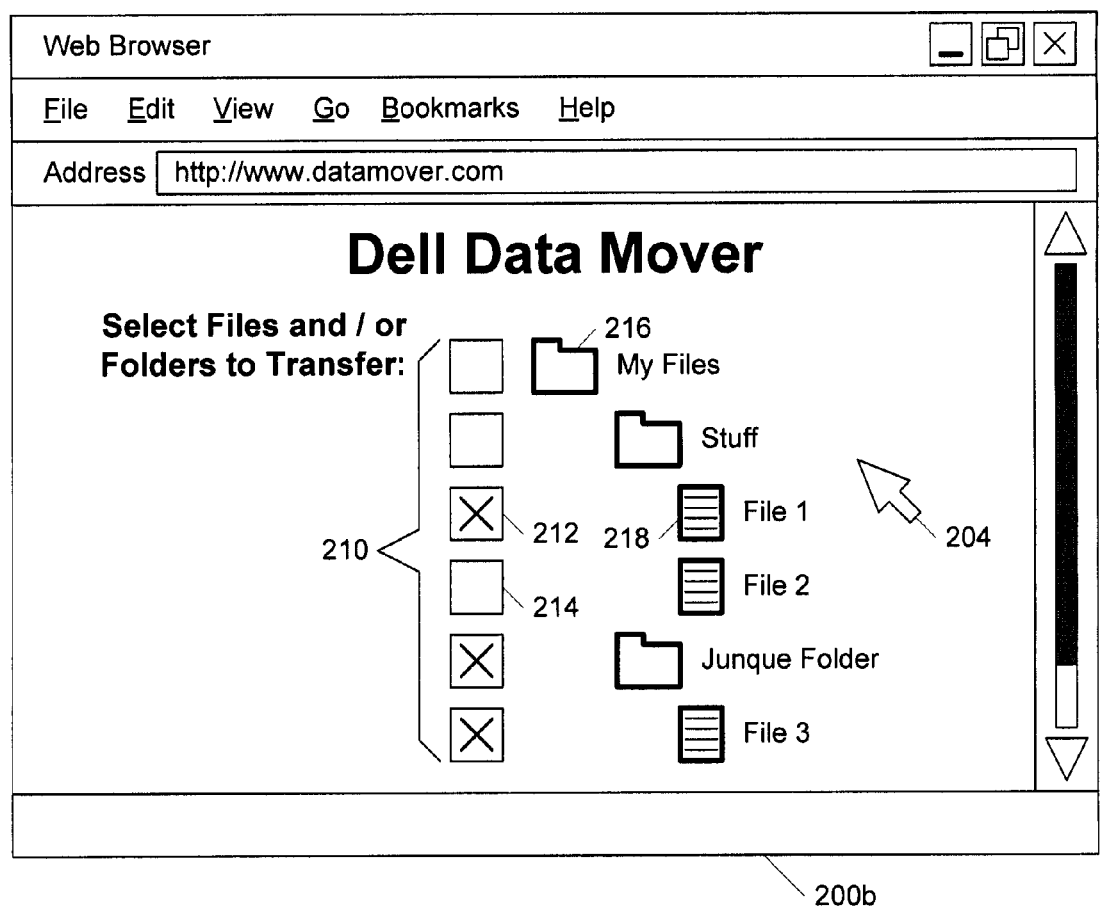
FIG. 2b is a diagram illustrating an embodiment of a second screen shot for selecting and migrating information and device drivers to a computer system.

FIG. 2b is a diagram illustrating an embodiment of a screen shot 200b generated by communications software 102 for selecting and migrating information and device drivers to a computer system. Screen shot 200b includes a display of information detected by wizard 124 and allows customer 10 to select files and directories by using pointer 204 within the display. The display includes checkboxes 210 that are each associated with a file or directory. Files are indicated using a file icon 218 and directories are indicated using a directory icon 216. In the example shown in FIG. 2b, a top level directory "My Files" is shown that includes the subdirectories "Stuff" and "Junque Folder" as indicated by these subdirectories being horizontally offset from the directory "My Files". The files "File 1" and "File 2" are included in the directory "Stuff" and the file "File 3" is included in the directory "Junque Folder". Other files and directories may be accessed by scrolling up or down in the display.

Customer 10 selects a file or directory by selecting the checkbox 210 associated with the file or directory. In the example of FIG. 2b, a checkbox 210 is indicated as selected if it includes an "X" such as checkbox 212 and is indicated as not selected if it is blank such as checkbox 214. Accordingly, the file "File 1" and the directory "Junque Folder" which includes the file "File 3" have been selected for migration in the example of FIG. 2b. It may be noted that all files and directories shown in FIG. 2b may be selected by selecting the checkbox associated with the directory "My Files".

Still further, wizard 124 may provide customer 10 with an ability to select device drivers for migration. Customer 10 may intend to use computer system 150 with one or more devices that customer 10 has been using with computer system 100. Examples of such devices include a printer, a scanner, a facsimile machine, a copier, a network device, and an audio device. Each of these devices typically operates in conjunction with a computer system using a device driver installed on the computer system. Accordingly, computer system 100 includes a device driver for each device used with it. This set of drivers is shown in FIG. 1 as drivers 106a.

To allow customer 10 to migrate device drivers, wizard 124 detects devices (not shown) associated with computer system 100. Wizard 124 causes these devices to be detected in any suitable way including detecting the presence of device drivers associated with these devices. After detecting the devices, wizard 124 provides customer 10 with an ability to select the devices that will be used with computer system 150. An example of this ability is shown in FIG. 2c.

Figure 2C:
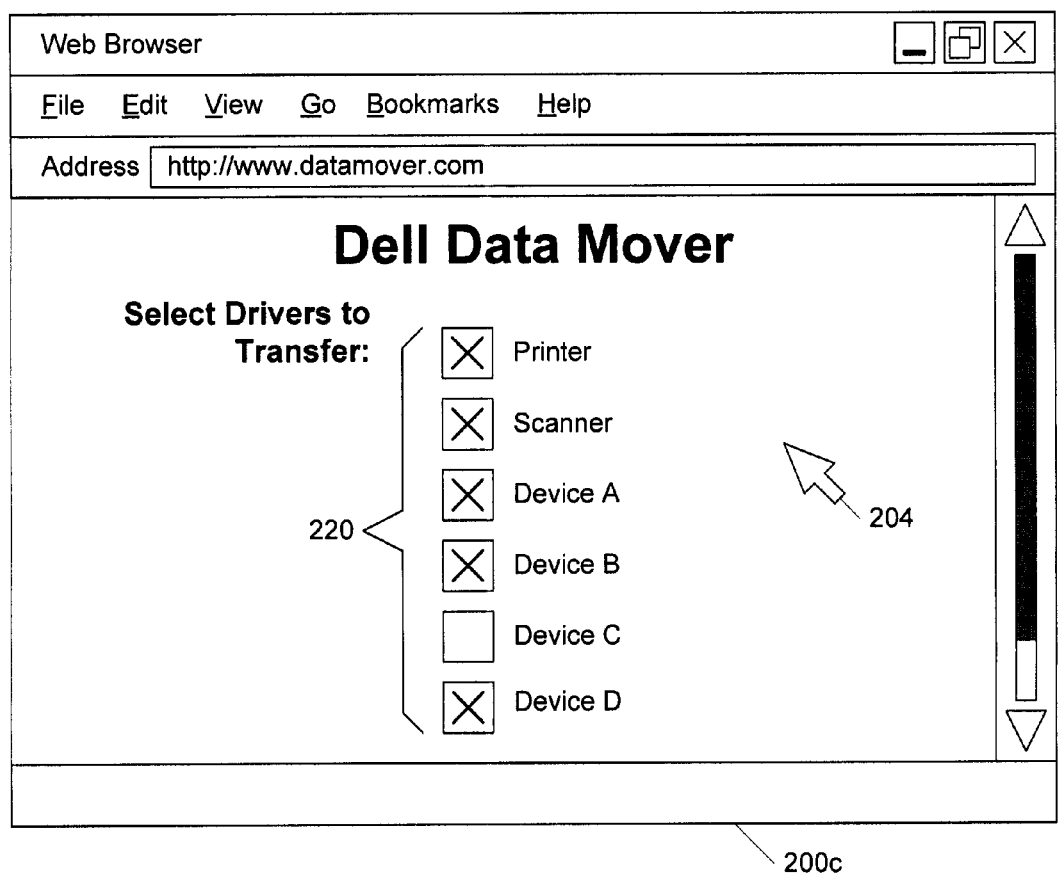
FIG. 2c is a diagram illustrating an embodiment of a third screen shot for selecting and migrating information and device drivers to a computer system.

FIG. 2c is a diagram illustrating an embodiment of a screen shot 200c generated by communications software 102 for selecting and migrating information and device drivers to a computer system. Screen shot 200c includes a display of information detected by wizard 124 and allows customer 10 to select device drivers by using pointer 204 within the display. The display includes checkboxes 220 that are each associated with a device. In the example shown in FIG. 2c, customer 10 may select from the following devices "Printer", "Scanner", "Device A", "Device B", "Device C", and "Device D". Other device drivers may be accessed by scrolling up or down in the display.

Customer 10 selects a device driver by selecting the checkbox 220 associated with the file or directory. In the example of FIG. 2b, a checkbox 220 is indicated as selected if it includes an "X" and is indicated as not selected if it is blank. Accordingly, each of the devices shown in FIG. 2c is selected except for "Device C".

After customer 10 selects information and device drivers to be migrated, computer system 120 causes the selected information and device drivers to be uploaded and stored on computer system 120. In FIG. 1, the information selected for migration by customer 10 is shown as data 104 and the set of device drivers selected for migration by customer 10 is shown as device drivers 106a. Accordingly, wizard 124 causes data 104 to be uploaded and stored onto computer system 120 as indicated by data 104 being shown in box 120a.

Prior to uploading device drivers 106a, wizard 124 first checks to see if an updated version of each device driver exists. An updated version of a device driver may be a more recent version issued by a manufacturer of a device associated with a device driver. An updated version may also be a different version of the device driver that is more suitable for use with computer system 150, e.g. if computer system 150 includes a different platform than computer system 100. Wizard 124 may perform this checking by consulting a list or a set of device drivers (not shown) or by accessing device driver information remotely from a computer system operated by a device manufacturer.

For each set of device drivers within device drivers 106a where an updated version of a device driver was not detected, wizard 124 causes these device drivers to be uploaded and stored onto computer system 120 as indicated by device drivers 106b. For each set of device drivers within device drivers 106a where an updated version was detected, wizard 124 causes the updated version of a device driver to be stored in device drivers 106b. An updated version of a device driver may be accessed from a set of device drivers 126 on computer system 120 or may be accessed remotely from a different computer system (not shown).

In other embodiments, wizard 124 checks to see if an updated version of each device driver exists subsequent to or simultaneous with uploading each of device drivers 106a. In another embodiment, wizard 124 does not cause any set of device drivers 106a to be uploaded from computer system 100. Rather, wizard 124 causes each set of device drivers from device drivers 106a, or an updated version thereof, to be accessed from device drivers 126 on computer system 120 or accessed from another computer system (not shown) and stored as device drivers 106b.

In order to allow customer 10 to migrate data 104 and drivers 106b from computer system 120 to computer system 150, network settings on computer system 150 need to be set to allow computer system 150 to communicate with computer system 120 using communications network 110. These network settings may be set in computer system 150 prior to computer system 150 being provided to customer 10, particularly where customer 10 selects a network provider such as an Internet Service Provider (ISP) as part of the order for computer system 150.

If the network settings are not set in computer system 150 prior to computer system 150 being provided to customer 10, then the network settings need to be set by customer 10. To allow customer 10 to more easily designate these settings, wizard 124 causes network settings 108 to be uploaded from computer system 100 and stored on computer system 120. Wizard 124 causes network settings 108 to be provided to manufacturing process 140 where network settings 108 are stored on a medium 160 along with a network wizard (not shown). Medium 160 may be a floppy disk, a CD-ROM, a hard disk drive or other storage device readable by computer system 150. Medium 160 is provided to customer 10 along with computer system 150.

Although shown in FIG. 1 as separate programs, order engine 122 and wizard 124 may be included in one program in other embodiments. In addition, the functions of order engine 122 and wizard 124 may be included in other programs in other embodiments. Order engine 122 and wizard 124 may be stored on any apparatus where they may be accessed by a computer system. Examples of such an apparatus include a hard disk drive, a CD-ROM, a CD-R, a CD-RW, a floppy disk, and a RAM.

Figure 3:
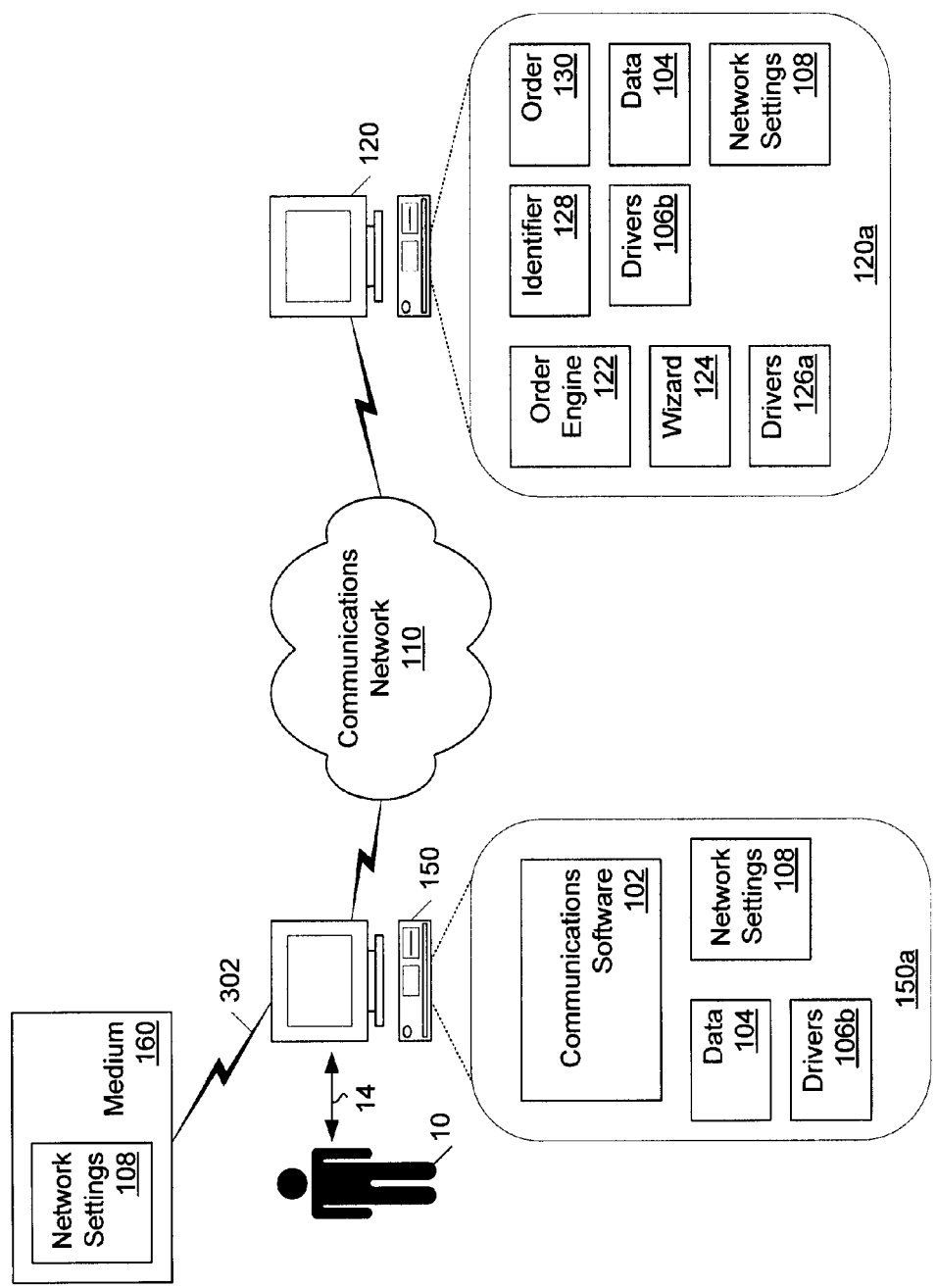
FIG. 3 is a diagram illustrating an embodiment of selected portions of a system for selecting and migrating information and device drivers to a computer system.

FIG. 3 is a diagram illustrating an embodiment of selected portions of a system for selecting and migrating information and device drivers to a computer system. FIG. 3 illustrates customer 10 using computer system 150 as indicated by an arrow 14 subsequent to computer system 150 being received by customer 10. Computer system 150 includes communications software 102.

In the embodiment shown in FIG. 3, medium 160 is configured to provide network settings 108 to computer system 150. Customer 10 connects medium 160 to computer system 150 and a network wizard (not shown) on medium 160 causes network settings to be stored onto computer system 150.

In another embodiment, computer system 150 is received by customer 10 with network settings 108 installed and set. In a further embodiment, wizard 124 causes computer system 100 to create a medium (not shown) that includes network settings 108 and a network wizard (not shown). Customer 10 provides this medium to computer system 150 and the network wizard causes network settings to be stored onto computer system 150.

After network settings 108 are installed onto computer system 150, computer system 150 accesses and downloads data 104 and/or device drivers 106b from computer system 120 using communications network 110. To connect with computer system 120, customer 10 provides an address to communications software 102. The address may be the same address that customer 10 used to access wizard 124 as described above in FIG. 1. Alternatively, wizard 124 may cause an address to be provided to customer 10 for downloading data 104 and/or device drivers 106b. The address may be provided in several ways. First, computer system 150 may include an icon (not shown) displayable on a display associated with computer system 150. Customer 10 may cause the download to be performed from computer system 120 by selecting the icon. The address may also be included on medium 160 and installed as part of the network settings. Further, wizard 124 may cause an email that includes the address to be sent to customer 10.

In response to customer 10 accessing computer system 120 using computer system 150, wizard 124 may provide information to customer 10 to allow customer 10 to complete the download of data 104 and/or device drivers 106b. At some point, wizard 124 detects a request from customer 10 to download data 104 and/or device drivers 106b. In response to the request, wizard 124 causes data 104 and/or device drivers 106b to be provided to computer system 150. An example is shown in FIG. 4.

Figure 4:
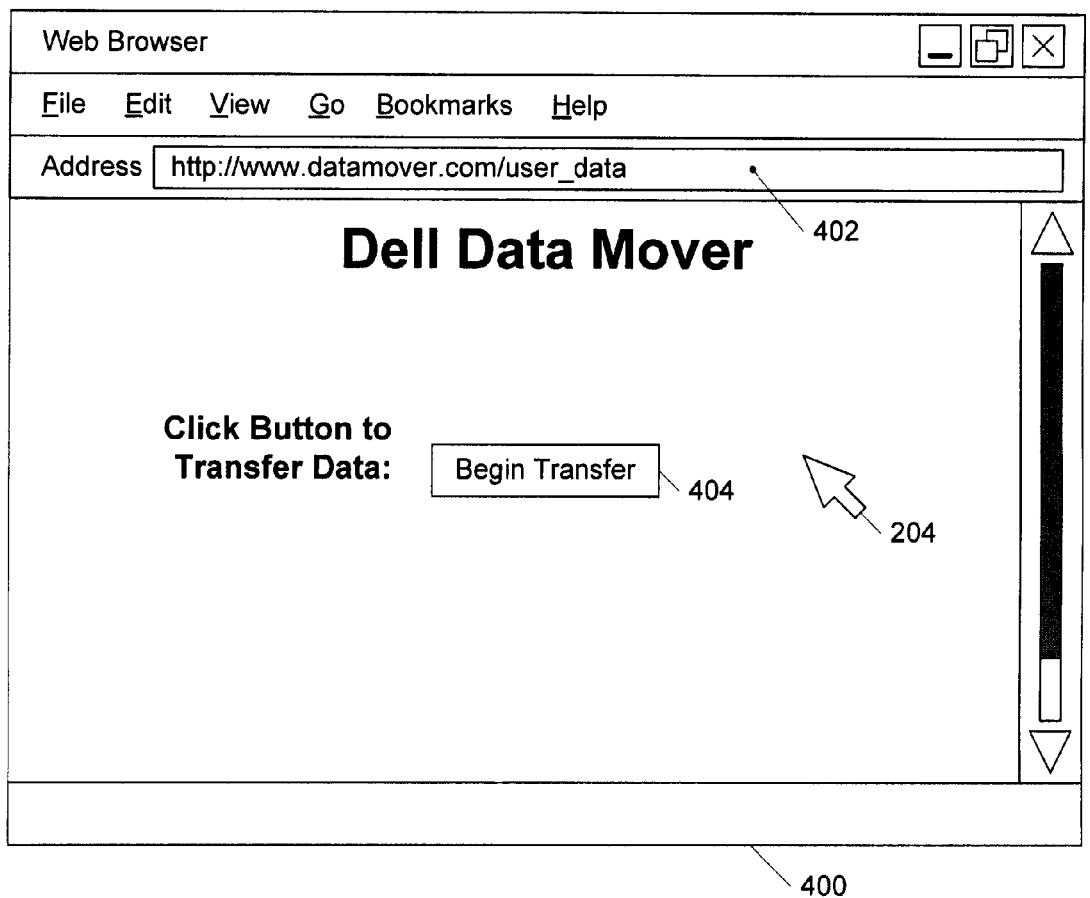
FIG. 4 is a diagram illustrating an embodiment of a fourth screen shot for selecting and migrating information and device drivers to a computer system.

FIG. 4 is a diagram illustrating an embodiment of a screen shot 400 for selecting and migrating information and device drivers to a computer system. Screen shot 400 is provided to computer system 150 for display to customer 10 in response to receiving the address from customer 10. As shown in FIG. 4, the address, e.g. http://www.datamover.com/user_data, appears in an address box 402. Customer 10 causes the download of data 104 and/or device drivers 106b by selecting a button 404 using pointer 204. The selection of button 404 causes a request to be transmitted to wizard 124.

Although not shown in FIG. 4, wizard 124 may provide customer 10 with an ability to select one or more locations to download the data 104 and/or device drivers 106b. For example, wizard 124 may allow customer 10 to select different directory locations on computer system 150 for different files in data 104. Wizard 124 may also provide a default option to customer 10 to allow data 104 and/or device drivers 106b to be stored in default locations. Wizard 124 may further provide customer 10 with an ability to only download part of, i.e. certain files from, data 104 or device drivers 106b. Data 104 and drivers 106b may be downloaded as part of the same download or as different downloads.

Wizard 126 may cause data 104 and device drivers 106b to be stored indefinitely on computer system 120 to provide a data backup for customer 10. Data 104 and device drivers 106b could also be provided to customer 10 in other ways such as by providing data 104 and device drivers 106b on a medium (not shown) suitable for use with computer system 150 to customer 10. The medium may be mailed to customer 10 or provided for pickup.

Figure 5:
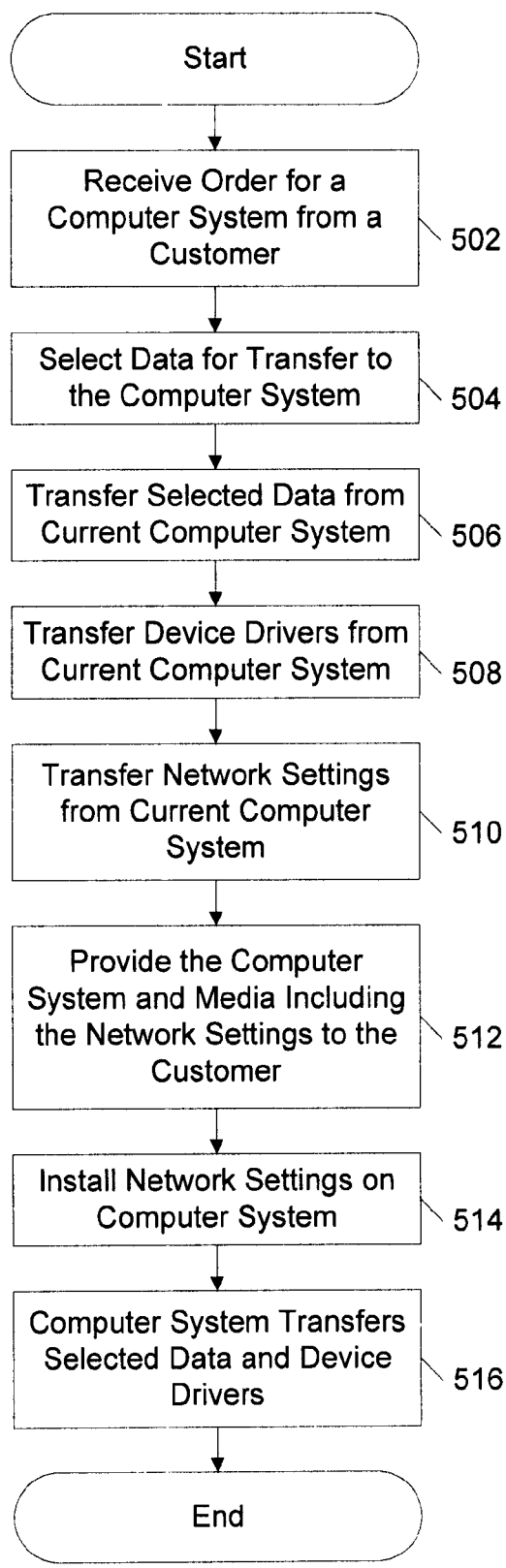
FIG. 5 is a flow chart illustrating an embodiment of a method for selecting and migrating information and device drivers to a computer system.

FIG. 5 is a flow chart illustrating an embodiment of a method for selecting and migrating information and device drivers to a computer system. In FIG. 5, an order for a computer system is received as indicated in step 502. Data is selected for transfer to the computer system as indicated in step 504. The selected data is transferred from a current computer system as indicated in step 506. Device drivers are transferred from the current computer system as indicated in step 508. Network settings are transferred from the current computer system as indicated in step 510. The ordered computer system and a media that includes the network settings are provided to the customer as indicated in step 512. The network settings are installed on the computer system as indicated by step 514. The computer system transfers the selected data and device drivers as indicated in step 516.

As can be seen, the principal advantages of these embodiments are that various shortcomings of previous techniques are overcome. For example, a computer manufacturer may provide customers the ability to migrate information and devices drivers to a new computer system without increasing the amount of time needed to manufacture the computer system. In addition, the embodiments may be used by a computer manufacturer or vendor to offer value added services to customers.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is
1. A method comprising:
receiving an order for a new computer from a customer, wherein the customer is in possession of a used computer;
providing a transfer wizard to the customer on the used computer;
receiving at least one file that is located on the used computer, over a network from the used computer, in response to the customer selecting the at least one file using the transfer wizard on the used computer;
storing the at least one file on a storage device;
receiving information about at least one used computer device driver that is located on the used computer, over the network from the used computer, in response to the customer selecting at least one used computer device driver using the transfer wizard on the used computer;
storing at least one new computer device driver, which is associated with the information about the at least one used computer device driver that is located on the used computer, on the storage device;
determining a plurality of network settings, wherein the plurality of network settings are operable to allow the new computer to communicate over the network in order to access the storage device;

providing the plurality of network settings on the new computer, wherein the new computer is operable to use the network settings to connect to the storage device over the network, retrieve the at least one file and the at least one new computer device driver stored on the storage device, and store the at least one file and the at least one new computer device driver on the new computer;

providing the new computer to the customer; and allowing the at least one file and the at least one new computer device driver to be retrieved by the new computer from the storage device subsequent to providing the new computer to the customer.

2. The method of claim 1,
wherein the transfer wizard is operable to detect the at least one file on the used computer; and
provide the customer with an ability to select the file.

3. The method of claim 2,
wherein the transfer wizard is operable to provide the customer with an ability to select a set of files from a plurality of files stored on the used computer, wherein the set of files is associated with a file type.

4. The method of claim 3,
wherein the transfer wizard is operable to provide the customer with an ability to select the set of files by providing the customer with a means for selecting a file extension associated with the file type.

5. The method of claim 2,
wherein the transfer wizard is operable to provide the customer with an ability to select a set of files from a plurality of files stored on the used computer, wherein the set of files is associated with a directory.

6. The method of claim 1, further comprising:
providing a web address to the customer, wherein the web address is usable by the new computer to access the at least one file and the at least one new computer device driver.

7. The method of claim 6, further comprising:
providing the web address to the customer by storing the web address on the new computer prior to providing the new computer to the customer.

8. The method of claim 1, wherein the receiving the information about at least one used computer device driver that is located on the used computer, over the network from the used computer, in response to the customer selecting the at least one used computer device driver using the transfer wizard on the used computer further comprises:

using the information about the at least one used computer device driver that is located on the user computer to determine if an updated version exists; and in response to an updated version not existing, storing the at least one new computer device driver that comprises the at least one used computer device driver that is located on the used computer;

in response to an updated version existing, storing the at least one new computer device driver that comprises an updated version of the at least one used computer device driver that is located on the used computer.

9. A system comprising:
a memory,
at least one secure computer for:
receiving an order for a new computer from a customer, wherein the customer is in possession of a used computer;
providing a transfer wizard to the customer on the used computer;
receiving at least one file that is located on the used computer, over a network from the used computer, in response to the customer selecting the at least one file using the transfer wizard on the used computer;
storing the at least one file on a storage device;
receiving information about at least one used computer device driver that is located on the used computer, over the network from the used computer, in response to the customer selecting at least one used computer device driver using the transfer wizard on the used computer;
storing at least one new computer device driver, which is associated with the information about the at least one used computer device driver that is located on the used computer, on the storage device;
determining a plurality of network settings, wherein the plurality of network settings are operable to allow the new computer to communicate over the network in order to access the storage device;
providing the plurality of network settings on the new computer, wherein the new computer is operable to use the network settings to connect to the storage device over the network, retrieve the at least one file and the at least one new computer device driver stored on the storage device, and store the at least one file and the at least one new computer device driver on the new computer;
providing the new computer to the customer; and
allowing the at least one file and the at least one new computer device driver to be retrieved by the new computer from the storage device subsequent to providing the new computer to the customer.

10. The system of claim 9, wherein the transfer wizard is operable to
detect the at least one file on the used computer; and
provide the customer with an ability to select the file.

11. The system of claim 10, wherein the
transfer wizard is operable to provide the customer with an ability to select a set of files from a plurality of files stored on the used computer, wherein the set of files is associated with a file type.

12. The system of claim 11, wherein the
transfer wizard is operable to provide the customer with an ability to select the set of files by providing the customer with a means for selecting a file extension associated with the file type.

13. The system of claim 10, wherein the
transfer wizard is operable to provide the customer with an ability to select a set of files from a plurality of files stored on the used computer, wherein the set of files is associated with a directory.

14. The system of claim 9, wherein the at least one secure computer is for:
providing a web address to the customer, wherein the web address is usable by the new computer to access the at least one file and the at least one new computer device driver.

15. The system of claim 14, wherein the at least one secure computer is for:
providing the web address to the customer by storing the web address on the new computer prior to providing the new computer to the customer.

16. The system of claim 9, wherein the receiving the information about at least one used computer device driver that is located on the used computer, over the network from the used computer, in response to the customer selecting the at least one used computer device driver using the transfer wizard on the used computer further comprises:

using the information about the at least one used computer device driver that is located on the user computer to determine if an updated version exists; and in response to an updated version not existing, storing the at least one new computer device driver that comprises the at least one used computer device driver that is located on the used computer;

in response to an updated version existing, storing the at least one new computer device driver that comprises an updated version of the at least one used computer device driver that is located on the used computer.

17. A computer program product stored on a non-transitory computer readable storage medium comprising:

at least one computer program processable by a computer to cause the computer to:

receive an order for a new computer from a customer, wherein the customer is in possession of a used computer;

provide a transfer wizard to the customer on the used computer;

receive at least one file that is located on the used computer, over a network from the used computer, in response to the customer selecting the at least one file using the transfer wizard on the used computer;

store the at least one file on a storage device;

receive information about at least one used computer device driver that is located on the used computer, over the network from the used computer, in response to the customer selecting at least one used computer device driver using the transfer wizard on the used computer;

store at least one new computer device driver, which is associated with the information about the at least one used computer device driver that is located on the used computer, on the storage device;

determine a plurality of network settings, wherein the plurality of network settings are operable to allow the new computer to communicate over the network in order to access the storage device;

provide the plurality of network settings on the new computer, wherein the new computer is operable to use the network settings to connect to the storage device over the network, retrieve the at least one file and the at least one new computer device driver stored on the storage device, and store the at least one file and the at least one new computer device driver on the new computer;

provide the new computer to the customer; and allow the at least one file and the at least one new computer device driver to be retrieved by the new computer from the storage device subsequent to providing the new computer to the custom.

18. The computer program product of claim 17, wherein the transfer wizard is operable to detect the at least one file on the used computer; and provide the customer with an ability to select the file.

19. The computer program product of claim 18, wherein the transfer wizard is operable to provide the customer with an ability to select a set of files from a plurality of files stored on the used computer, wherein the set of files is associated with a file type.

20. The computer program product of claim 19, wherein the transfer wizard is operable to provide the customer with an ability to select the set of files by providing the customer with a means for selecting a file extension associated with the file type.

21. The computer program product of claim 18, wherein the transfer wizard is operable to provide the customer with an ability to select a set of files from a plurality of files stored on the used computer, wherein the set of files is associated with a directory.

22. The computer program product of claim 17, wherein the computer program is processable by the computer to cause the computer to:

provide a web address to the customer, wherein the web address is usable by the new computer to access the at least one file and the at least one new computer device driver.

23. The computer program product of claim 22, wherein the computer program is processable by the computer to cause the computer to:

provide the web address to the customer by storing the web address on the new computer prior to providing the new computer to the customer.

24. The computer program product of claim 17, wherein the new computer device driver includes an updated version of the at least one used computer device driver that is located on the used computer.

25. The computer program product of claim 17, wherein the new computer device driver includes the at least one used computer device driver that is located on the used computer.

* * * * *